(12) United States Patent
Kim et al.

(10) Patent No.: US 9,278,864 B2
(45) Date of Patent: Mar. 8, 2016

(54) METHOD FOR PREPARING MONOSILANE USING TRIALKOXYSILANE

(71) Applicants: OCI COMPANY LTD., Seoul (KR); INSTITUTE OF ION-PLASMA AND LASER TECHNOLOGIES, Tashkent (UZ)

(72) Inventors: Taek Joong Kim, Seoul (KR); Yong Il Kim, Incheon (KR); Kyung Yeol Kim, Seoul (KR); Deok Yun Kim, Seongnam-si (KR); Ashurov Khatam, Tashkent (UZ); Salikhov Shavkat, Tashkent (UZ); Rotshteyn Vladimir, Tashkent (UZ); Ashurova Khekayat, Tashkent (UZ); Kurbanov Aziz, Tashkent (UZ); Abdisaidov Ilyos, Tashkent (UZ); Azizov Sultan, Tashkent (UZ); Ashurov Rustam, Tashkent (UZ)

(73) Assignees: OCI COMPANY LTD., Seoul (KR); INSTITUTE OF ION-PLASMA AND LASER TECHNOLOGIES, Tashkent (UZ)

( * ) Notice: Subject to any disclaimer, the term of this patent is extended or adjusted under 35 U.S.C. 154(b) by 0 days.

(21) Appl. No.: 14/432,900

(22) PCT Filed: Oct. 2, 2013

(86) PCT No.: PCT/KR2013/008840
§ 371 (c)(1),
(2) Date: Apr. 1, 2015

(87) PCT Pub. No.: WO2014/054889
PCT Pub. Date: Apr. 10, 2014

(65) Prior Publication Data
US 2015/0251916 A1    Sep. 10, 2015

Related U.S. Application Data

(63) Continuation of application No. PCT/KR2013/003743, filed on Apr. 30, 2013.

(30) Foreign Application Priority Data

Oct. 2, 2012   (UZ) .................................. 20120401
Dec. 21, 2012  (KR) ....................... 10-2012-0150993

(51) Int. Cl.
  *C01B 33/04*  (2006.01)
  *B01J 23/72*  (2006.01)

(52) U.S. Cl.
  CPC .............. *C01B 33/043* (2013.01); *B01J 23/72* (2013.01)

(58) Field of Classification Search
  CPC ........................................................ C01B 33/04
  USPC ..................................................... 423/347
  See application file for complete search history.

(56) References Cited

U.S. PATENT DOCUMENTS

| | | | |
|---|---|---|---|
| 2,530,367 | A | 11/1950 | Hance et al. |
| 3,775,457 | A | 11/1973 | Muraoka et al. |
| 3,829,555 | A | 8/1974 | Muraoka et al. |
| 4,904,460 | A | 2/1990 | Wada et al. |
| 5,084,590 | A | 1/1992 | Ritscher et al. |
| 6,580,000 | B1 | 6/2003 | Anderson et al. |
| 2007/0060764 | A1 | 3/2007 | Lewis et al. |
| 2011/0200513 | A1 | 8/2011 | Ohno et al. |
| 2012/0226064 | A1 | 9/2012 | Ohno et al. |

FOREIGN PATENT DOCUMENTS

| | | |
|---|---|---|
| CN | 101671028 B | 6/2011 |
| DE | 3311650 A1 | 10/1983 |
| FR | 1428987 A | 2/1966 |
| FR | 2154728 A1 | 5/1973 |
| FR | 2156655 A1 | 6/1973 |
| JP | 0725534 B2 | 3/1995 |
| JP | 2615798 B2 | 6/1997 |
| JP | 10168084 A | 6/1998 |
| KR | 20080044290 A | 5/2008 |
| RU | 2173297 C2 | 9/2001 |
| RU | 2194009 C1 | 12/2002 |

OTHER PUBLICATIONS

International Search Report for PCT/KR2013/008840, mailed on Nov. 26, 2013.
European Search Report dated Oct. 21, 2015 in connection with the counterpart European Patent Application No. 13844235.5.

*Primary Examiner* — Edward Johnson
(74) *Attorney, Agent, or Firm* — Hauptman Ham, LLP

(57) ABSTRACT

Provided is a method for preparing monosilane, more particularly a method for economically preparing monosilane, which is useful for the composition of a thin semiconductor structure and multipurpose high-purity polycrystalline silicon, by preparing monosilane with high purity and high yield using trialkoxysilane.

20 Claims, 1 Drawing Sheet

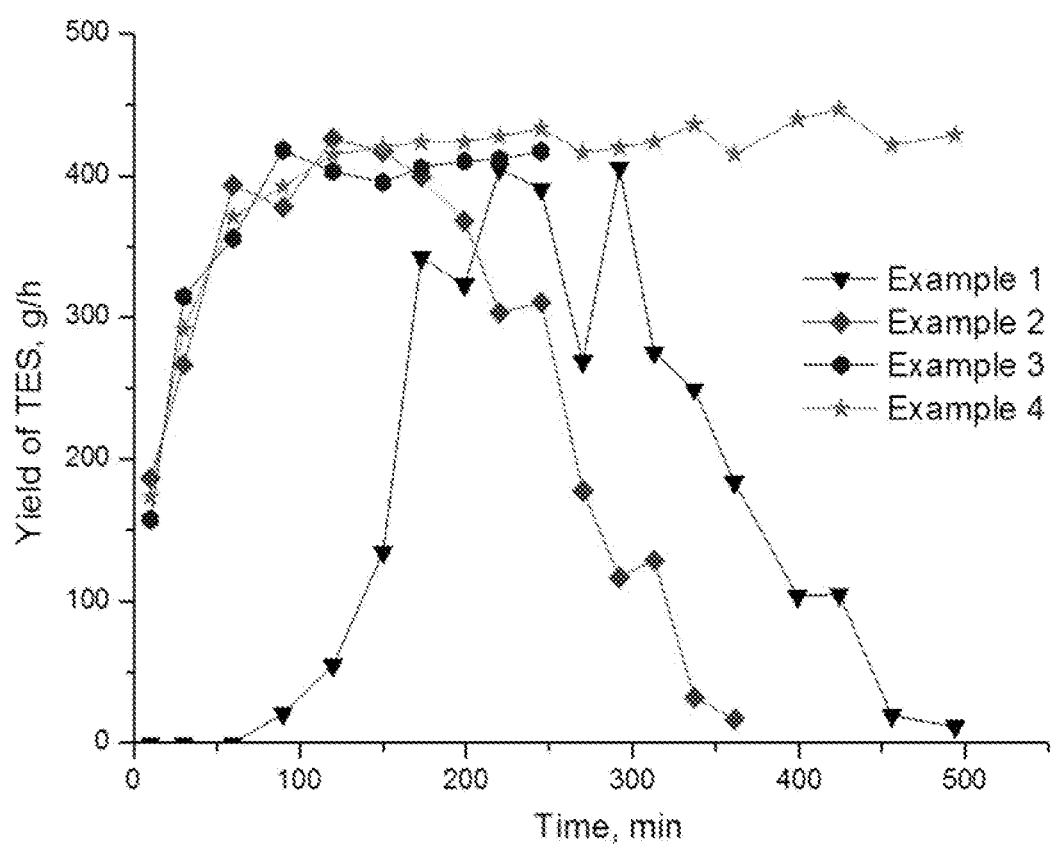

METHOD FOR PREPARING MONOSILANE USING TRIALKOXYSILANE

CROSS REFERENCE TO RELATED APPLICATION

This application claims the priority of Uzbekistan Patent Application No. IAP 20120401 filed on Oct. 2, 2012 in the Uzbekistan Patent and Trademark Office, Korean Patent Application No. 10-2012-0150993 filed on Dec. 21, 2012 in the Korean Patent and Trademark Office and a PCT International Application No. PCT/KR2013/003743 filed on Apr. 30, 2013. Further, this application is the National Phase application of International Application No. PCT/KR2013/008840 filed on Oct. 2, 2013, which is incorporated herein by reference in its entirety.

TECHNICAL FIELD

The present invention relates to a method for preparing monosilane, and more particularly, to a method for economically preparing monosilane, which is useful for forming a thin film of a semiconductor and for multipurpose high-purity polycrystalline silicon, by preparing monosilane with high purity and high yield using trialkoxysilane.

BACKGROUND ART

Monosilane is present in a gas state with a boiling point of 112° C. under general conditions. Monosilane is actively decomposed at a temperature of 700° C. or more into silicon, which is a basis for obtaining high-purity silicon, and hydrogen.

A series of methods of synthesizing monosilane have been widely known. For example, as a catalytic disproportionation method of trichlorosilane, a two-step technology is known (German Patent No. 3311650 (Oct. 13, 1983). In the technology, the first step corresponds to performing catalytic hydrogenation of metallic silicon, and at this time, the hydrogenation is conducted along with production of trichlorosilane at a temperature from 400° C. to 600° C. and a pressure from 0.7 bar to 41.4 bar. In the second step, a catalytic disproportionation reaction of trichlorosilane is performed. At this time, an anion exchange resin is used as a catalyst along with tertiary amine, and the disproportionation is performed at a maximum temperature of 150° C. Thereafter, impurities of monosilane are removed. However, when a corrosive chlorine compound is present, the invention makes it difficult to purify monosilane into high-purity monosilane due to transfer of impurities from the wall of equipment toward monosilane and causes an increase in the price of a final product, and thus it is difficult to widely use the method to prepare monosilane.

Further, as a method of preparing silane using reaction of silicon tetrachloride with lithium hydride, a method according to Russian Patent No. 2173297 (2001) is also widely known. In the method, lithium hydride is pulverized beforehand, and then the process is conducted at a temperature of 300° C. Lithium chloride produced during the reaction is used for regeneration of LiH. At this time, hydrogen chloride is produced. A major disadvantage of the method is that it is necessary to remove a starting reagent from silane, particularly, hydrogen chloride residue. In relation to this, there is a problem in that it is required to additionally perform a difficult process of removing HCl from a final product.

As another method of preparing silane, there is a method of preparing silane by treating lithium silicide with a dilute solution of hydrochloric acid, nitric acid or sulfuric acid according to Russian Patent No. 2194009 (2002). As a major disadvantage of the method, there is a problem in that it is necessary to additionally perform a difficult process of removing a starting reagent, that is, hydrogen chloride or the corresponding acetic acid or sulfuric acid residue from silane. Examples of other limitations include high exothermicity, and when a violation occurs in the replenishment mode of a starting reagent in a reactor, the reactor is likely to explode.

A method of preparing monosilane using catalytic disproportionation of alkoxysilane is one of the promising methods. The method was proposed in U.S. Pat. No. 2,530,367 in 1947, and the disproportionation in the invention is performed by the following Reaction Equation A.

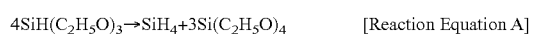

$$4SiH(C_2H_5O)_3 \rightarrow SiH_4 + 3Si(C_2H_5O)_4 \quad \text{[Reaction Equation A]}$$

The foundation for the catalytic disproportionation of alkoxysilane was established in the former Soviet Union in 1957 to 1959, and the reason for this appears to be that triethoxysilane was usually developed at that time [Soviet Journal of Technical Physics, 1957, v. 27, No. 8, pp. 1645-1648 and Soviet Journal of Solid State Physics, 1959, v. 1, pp. 999-1001].

U.S. Pat. No. 3,829,555 (Aug. 13, 1974) proposed a continuous synthesis process of monosilane. In the invention, sodium ethoxide in tetraethoxysilane acts as a catalyst in a disproportionation reaction of triethoxysilane, the reaction was conducted in a liquid phase, and the conversion ratio of triethoxysilane ranged from 70% to 90%.

DISCLOSURE

Technical Problem

In order to solve the problem of the induction period during the initial period of the reaction when alkoxysilane is prepared, the decrease in selectivity and conversion ratio of a final product, the problem of continuous reaction, the decrease in productivity and the like, an object of the present invention is to provide a new method for preparing monosilane, which simplifies and improves the preparation process while ensuring continuity, operability, productivity, and stability.

Further, in order to remove the above-described disadvantages in the related art, an object of the present invention is to provide a method for preparing monosilane, which ensures rapid reduction or removal of the initial induction period of the synthesis reaction of alkoxysilane, simplification of the technology, improvement in reaction selectivity, and possibility of synthesis of monosilane through a continuous process.

Technical Solution

In order to solve the above-described problems, the present invention provides a method for preparing monosilane, which includes: (a) performing wet pulverization of silicon particles in a liquid-phase solvent until the silicon particles have a size from 30 μm to 100 μm; (b) continuously supplying a suspension, which includes pulverized silicon obtained in step (a) and the solvent, into a reactor, followed by synthesizing alkoxysilane of triethoxysilane and tetraethoxysilane through reaction of the pulverized silicon particles with anhydrous ethyl alcohol using a copper-based catalyst; and (c) synthesizing monosilane gas from the obtained triethoxysilane by performing a catalytic disproportionation process of the triethoxysilane using sodium ethoxide as a catalyst.

Advantageous Effects

When monosilane is prepared according to the above-described technical solution according to the present invention, performance is excellent, and feasibility is sufficient under laboratory conditions as well as at industrial scale. In addition, there is an effect that the preparation process may be simplified and improved while ensuring continuity, operability, productivity, and stability of the preparation process.

Furthermore, as specific effects, there are improved effects as follows.

It is possible to decrease the initial induction period of the synthesis of alkoxysilane by approximately 15 times.

Process selectivity for triethoxysilane, which is a main product, is ensured at the 96% level.

A synthesis reaction of triethoxysilane and monosilane may be performed in a continuous process which maintains a high and stable synthesis rate.

The productivity of the preparation process is increased by decreasing the contact time of a reagent by 5 times or more.

The conversion ratio of triethoxysilane into monosilane is excellent.

DESCRIPTION OF DRAWINGS

FIG. 1 is a graph illustrating the comparison of a change in yield of triethoxysilane per unit time and an induction time of the initial reaction vs. the synthesis process time of triethoxysilane each prepared in Examples 1 to 4 according to the present invention.

BEST MODE

Hereinafter, embodiments of the present invention will be described in detail with reference to the accompanying drawings. It should be understood that the present invention is not limited to the following embodiments and may be embodied in different ways, and that the embodiments are provided for complete disclosure and thorough understanding of the invention by those skilled in the art.

Hereinafter, the present invention will be described in detail as one embodiment.

The present invention provides a method for preparing monosilane, which includes: (a) performing wet pulverization of silicon particles in a liquid-phase solvent until the silicon particles have a size from 30 μm to 100 μm; (b) continuously supplying a suspension, which includes pulverized silicon obtained in step (a) and the solvent, into a reactor, followed by synthesizing triethoxysilane and tetraethoxysilane through reaction of the pulverized silicon particles with anhydrous ethyl alcohol using a copper-based catalyst; and (c) synthesizing monosilane gas from the for obtained triethoxysilane by performing a catalytic disproportionation process using sodium ethoxide as a catalyst.

When a solvent is used in synthesizing alkoxysilane, the temperature region in the reaction mixture becomes uniform, overheating is significantly decreased, side reaction is suppressed, and, as a result, selectivity is improved and a silicon conversion ratio is also improved.

During synthesis of alkoxysilane, the temperature is maintained up to 300° C., which is a relatively high temperature, and thus as a solvent to be used, a solvent that is not decomposed in a reaction region at such a temperature needs to be selected. The solvent also needs to be effective such that the uniform temperature and dispersibility of silicon powder may be secured in a reaction system, and the solvent should not be oxidized at a reaction temperature from 100° C. to 300° C. In a series of inventions, as the solvent, alkylated benzene and alkylated naphthalene-"THERMINOL" oil may be used. Examples of the solvent suitable at high temperature include THERMINOL® 59, THERMINOL® 60, THERMINOL® 66, DOWTHERM® HT, MARLOTHERM® S, and MARLOTHERM®.

An induction period is required for reaction of alcohol and silicon, and the length of the induction period may range from about 1 hour to about 12 hours. A major reason for the induction period is that an oxide film influences the surface of silicon. In order to decrease the induction period, additional activation may be performed in the synthesis process of alkoxysilane.

As for an activation process, activation may be induced in another separate apparatus or in the reactor in which the reaction takes place, and when the separate apparatus is used, activated silicon may be transferred to a reactor in a dry and neutral environment. Activation may be implemented at a temperature from 20° C. to 400° C. (recommended temperature from 150° C. to 300° C.), and hydrogen and nitrogen may be used together as activators. For example, a reaction suspension containing 1 kg of silicon, 14.1 g of copper hydroxide and 2.1 kg of the solvent MARLOTHERM® S may be activated with hydrogen and nitrogen at a temperature from 150° C. to 250° C. for 65 minutes. Specifically, methyl alcohol is introduced at a rate of 4.3 g/min at 250° C. for 5 hours, followed by reducing a temperature to 230° C. Next, the supply of methyl alcohol is stopped, followed by beginning to supply ethyl alcohol at the same rate. Here, the supply of hydrogen is also stopped, but the supply of nitrogen is maintained. The total amount of the activator is stoichiometrically calculated, and needs to be sufficient to dissociate the copper catalyst in a divalent or monovalent state into free copper.

A reaction material may be activated by maintaining a high temperature in an inert environment such as nitrogen, argon and the like, and silicon may be pre-mixed with a catalyst in an inert environment for 8 hours.

For activation of silicon, a halide such as alkyl chloride, hydrogen chloride, ammonium chloride and $NH_4HF_2$ may be introduced before the synthesis. When a process of preparing alkoxysilane is conducted based on the reaction of silicon with ethyl alcohol, the activation of silicon may be performed with methyl alcohol because methyl alcohol has a better reaction activity for silicon than ethyl alcohol or higher alcohols. For example, when 5% methyl alcohol is added to ethyl alcohol, the reaction rate is significantly increased. It is necessary to pay attention to the fact that a process of removing impurities such as distillation is essentially performed from a target product prepared when a material such as a halide, alkyl halide and methanol is introduced into a reactor before synthesis because impurities decrease productivity and complicate the process of preparing alkoxysilane.

Solutions widely known up until now fail to consistently explain the cause of the induction period in the direct synthesis process of alkoxysilane and the characteristics thereof, and a technical solution by which the problems may be effectively addressed has yet to be introduced. A solution, in which additionally introducing a reagent during the synthesis process is a basic concept, makes it necessary to remove residue from the final product, and thus additional work is needed and the process of preparing alkoxysilane is complicated, thereby increasing the price of the final product.

As another problem, it is also widely known that side reactions take place during the synthesis reaction of alkoxysilane in a reactor, and thus oligo-alkoxysilane, water, and other secondary side products are produced, and these side products are accumulated in a reaction environment, thereby decreasing the process rate. Most of the reactions use metal as a catalyst, and the metal is usually present in the form of an impurity in silicon which is initially used. Metal copper is usually produced within a solvent component as a result of decomposition of a copper-containing material that is used as a catalyst in the main synthesis reaction.

When residual silicon, impurities and alkoxysilane, which are contained in the processed silicon material, are accumulated, such accumulation also decreases the reaction rate. When the solvent is to be used later in the synthesis of alkoxysilane, such a process requires regeneration of the solvent.

It is possible to conduct direct synthesis of silicon and alcohol in both the batch mode and the continuous mode. In the batch mode, the total amount of silicon is introduced into a reactor at the start of the process, and alcohol is continuously supplied until the silicon is completely reacted. A method of supplying a predetermined amount of silicon in a dosage amount and continuously supplying alcohol may also be used.

In the continuous mode, only silicon or a catalyst-containing silicon is added after the operation thereof. Further, adjustment is needed in order to minimize the content of the catalyst and prevent the side reaction of decomposing alcohol from taking place.

The reaction is conducted at a temperature of 150° C. or more. At a temperature lower than 150° C., decomposition of alcohol or the solvent takes place. Preferably, the process is conducted at a temperature from 200° C. to 260° C. Reaction with methyl alcohol is conducted while maintaining the temperature from 220° C. to 250° C., if possible, and the temperature may range from 200° C. to 240° C. in the case of ethyl alcohol.

Although direct synthesis reaction of alkoxysilane is possible at both increased and reduced pressures, the reaction is preferably conducted under atmospheric pressure.

In the method for preparing monosilane according to the present invention, the pulverization process of silicon having a particle size of up to 500 µm may be performed at atmospheric pressure. Ethanol or methanol is used as an alcohol reagent, and triethoxysilane or trimethoxysilane is prepared as a final product. As a catalyst, compounds containing copper are usually used, and among them, copper (I) chloride (CuCl) is frequently used and a major technical process of reacting pulverized silicon with alcohol is conducted in an environment in which the above-described polyaromatic oils and other oils as a solvent are heated up to 200° C.

A reagent may be used as a technical activation method. The reagent is used under the following conditions, and when trialkoxysilane is prepared in the reaction material according to the described scheme, impurities present in the starting reagent are accumulated, and first, when copper is present in the final product, the quality of the semiconductor-level silicon, that is, the efficiency of the solar cell is usually degraded. The reaction material is disproportionately consumed, and a portion of the solvent is sometimes consumed in a side reaction that produces impurities from the starting reagent. Therefore, unreacted silicon is present in the reaction material.

For this reason, activation of the reagent is conducted, and the activation process is summarized as discharging a suspension containing unreacted silicon from the reaction mixture, replenishing the solvent and the catalyst as much as necessary, and again circulating the reagent, in which the component is replenished, by the technical process. While the process is conducted, a series of complicated bleeding tasks are conducted regularly several times until unreacted silicon forms a precipitate in a reactor.

According to the method for preparing monosilane according to the present invention, for preparation of high-purity monosilane, metal silicon is first reacted with an organic alcohol, preferably ethyl alcohol at a high temperature by using a catalyst. At a high temperature, it is possible to produce alkoxysilane of which the target product is trialkoxysilane.

When metal silicon is reacted with an organic alcohol in a solvent having a high boiling point, the reaction is conducted using a copper compound as a catalyst in an environment of a solvent having a high boiling point (acetate, oxalate or chloride), and aluminum or an Al—Si alloy is added thereto. In this case, the conversion ratio of metal silicon is high (maximally 99.8%), and thus a solvent having a high boiling point is easily separated from a metal precipitate and it is possible to use the separated solvent again in the process.

When a final product produced by reacting metal silicon with the organic alcohol is then condensed, trialkoxysilane (about 50% by weight), tetraalkoxysilane (about 10% by weight), unreacted alcohol (about 25% by weight), diethoxysilane impurities (maximally about 3% by weight), a chlorine compound (maximally about 1% by weight) and the like are included therein. In order to decrease the possibility of substituting the hydrogen bond with an ethoxy group, which decreases the content of triethoxysilane in the reaction product, the organic alcohol is first separated in the first-step purification of the condensate. When rectification is performed at a low pressure (about 100 mmHg) in the process, the organic alcohol is separated at a temperature close to room temperature, and the bonding of silicon to hydrogen may be almost perfectly broken. The separated organic alcohol contains no moisture and contains small amounts of alkoxysilane and a volatile chlorine compound, but there is no particular problem in reaction with silicon for preparation of alkoxysilane. The subsequent purification of alkoxysilane is conducted according to known technology.

The method for preparing monosilane according to the present invention has the following advantages. A volatile component, that is, the organic alcohol is separated well from the condensate, the process is performed in a state in which low electric power is consumed, the temperature is lowered, and the bonding of di- and tri-alkoxysilane is hardly broken, thereby increasing the yield of monosilane under disproportionation.

The purified alkoxysilane mixture composed of di-, tri- and tetraalkoxysilane is transferred to the catalytic disproportionation. At this time, the reaction equation is represented by the following Reaction Equation B.

[Reaction Equation B]

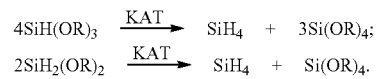

A solution of alkoxide, an alkaline earth metal and aluminum in tetraalkoxysilane is used as a catalyst. Alkoxysilane and the catalyst at a ratio of 20:1 to 10:1 are regularly or continuously, preferably continuously, supplied to a disproportionation reactor.

The monosilane produced is saturated with alkoxysilane vapor, and when the disproportionation reaction temperature is increased, the vapor concentration of alkoxysilane in monosilane is also increased. Accordingly, disproportionation should be performed at as low a temperature as possible, preferably in the range from −20° C. to +40° C. The most important characteristic of the disproportionation process is the conversion ratio of alkoxysilane in which bonding of silicon and hydrogen is contained into monosilane. In order to obtain the maximum conversion ratio, reaction time plays a very important role in addition to other conditions. When the disproportionation process is conducted in a continuous process, the contact time is essentially from 1 hour to 50 hours, preferably from 10 hours to 25 hours. In consideration of fire caused by monosilane and explosiveness of monosilane, and contamination of ambient environments caused by impurities, disproportionation is performed in sealed equipment, and the equipment does not need a stirring apparatus and allows an engine disposed outside the reactor to perform stirring in the stirring apparatus. When the proposed disproportionation mode is performed, the conversion ratio of alkoxysilane may reach 98%.

Hereinafter, the method for preparing monosilane according to the present invention will be described in more detail.

In step (a), the liquid-phase solvent may be directly used as a solvent in a synthesis process of alkoxysilane in step (b) performed after step (a).

In step (a), synthesis of alkoxysilane of triethoxysilane and tetraethoxysilane may be performed in the solvent environment, which has been heated up to 160° C. to 300° C.

In step (b), silicon consumed in synthesis reaction of the synthesis process of alkoxysilane is replenished by continuously supplying the suspension, which includes pulverized silicon obtained in step (a) and the solvent, into the reactor while the synthesis process is conducted, and, in order to continuously and stably conduct the synthesis reaction, an amount of the suspension supplied into the reactor is determined such that an amount of silicon supplied by the suspension is the same as an amount of reacted silicon. Here, an amount of silicon consumed in the synthesis reaction can be calculated from an amount of synthesized alkoxysilane according to the following Equation 1.

$$mSi = k1 \cdot mTES + k2 \cdot mTEOS \quad \text{[Equation 1]}$$

wherein mSi is a mass of silicon consumed as a result of direct reaction for unit time, mTES is a mass of triethoxysilane prepared as a result of direct reaction for unit time, mTEOS is a mass of tetraethoxysilane prepared as a result of direct reaction for unit time, coefficient k1 is a molecular weight ratio of silicon to triethoxysilane [molecular weight of silicon/molecular weight of triethoxysilane], and coefficient k2 is a molecular weight ratio of silicon to tetraethoxysilane [molecular weight of silicon/molecular weight of tetraethoxysilane].

There is a slight initial induction period until yield reaches a certain level upon synthesis of alkoxysilane. The method for preparing monosilane can minimize or reduce the initial induction period until a yield reaches a certain level upon synthesis of alkoxysilane by wet-pulverizing silicon particles in a liquid-phase solvent by step (a) and introducing the intact wet-pulverized silicon particles into the reactor for synthesis of alkoxysilane in step (b) along with the solvent by a continuous process.

Each operation can be more specifically described as follows. First, by performing a pulverization process of silicon in a liquid-phase solvent environment until the silicon particles have a size from 30 μm to 100 μm, the pulverization process of silicon may be conducted in a wet manner without contact of a surface of silicon with air. Then, by introducing the suspension including intact pulverized silicon and the solvent into the synthesis process of alkoxysilane, the solvent of the suspension is directly used as the solvent in the in situ synthesis of alkoxysilane. The prepared suspension is continuously supplied to the reactor while the synthesis process of alkoxysilane is conducted.

Specifically, the initial silicon such as metal silicon having a purity from 98% to 99% is pulverized using a hammer crusher to a maximum particle size 1 mm. Next, the metal silicon is crushed by using a general planetary mill according to a method known in the art until the particle size is 30 μm to 100 μm. To the operating volume of the crusher, a solvent such as, for example, THERMINOL® 66 or other polyaromatic oils is added, and then silicon is pulverized in a solvent environment as described above.

The suspension including the pulverized silicon may be continuously supplied into the reactor using a metering pump. Here, in the suspension, silicon is not separated from the solvent.

In the reactor, alkoxysilane is synthesized by reaction of anhydrous ethyl alcohol and silicon. An alcohol known in the art, such as methyl alcohol, other than anhydrous ethyl alcohol as set forth above, may be used. In the synthesis reaction of alkoxysilane, a copper-based catalyst known in the art, such as copper (I) chloride, may also be used, and the process is performed in an environment of solvent having a high boiling point. Here, the solvent used in the process may include THERMINOL® 59, THERMINOL® 60, THERMINOL® 66, DOWTHERM® HT, MARLOTHERM® S, MARLOTHERM®, other polyaromatic oils, and the like.

Impurities accumulated in the reactor are removed by continuously discharging the suspension again from the reactor in the same amount as the suspension supplied into the reactor, whereby the synthesis reaction in the reactor can be activated.

In order to ensure that a continuous and stable reaction is conducted, silicon is replenished in the same amount as silicon consumed in the synthesis reaction of alkoxysilane by continuously supplying the suspension including pulverized silicon and the solvent to the reactor while the synthesis process of alkoxysilane is conducted. The amount of silicon consumed in the synthesis reaction of alkoxysilane is determined by calculating an amount of synthesized alkoxysilane, and a numerical formula for the calculation is the same as Equation 1.

In order to prevent the decrease in reactivity caused by accumulation of impurities in a reaction environment, the accumulated impurities may be removed from the reactor by continuously discharging the suspension from the reactor to conduct an additional bleeding process. Here, the solvent is continuously supplied in a suspension state into the reactor such that the same amount as the amount of the discharged suspension is replenished again. By doing this, a reaction product is continuously produced in the reactor.

The silicon particles before pulverization may have a particle size of 20 mm or more. For example, the silicon particles before pulverization may have a particle size from 20 mm to 50 cm. Here, the term "size" in the silicon particles before pulverization refers to the longest distance among distances between two points obtained when a straight line crossing a center of gravity of one particle intersects a surface of the particle.

In the suspension continuously introduced into the reactor, a mass ratio of silicon to the solvent may range from 1:2 to 2:1.

In the process of pulverization of silicon in a solvent environment, the wet pulverization process may be performed by mixing the copper-based catalyst in an amount needed in the synthesis reaction of alkoxysilane with the silicon particles beforehand.

When alkoxysilane of the catalyst for the synthesis reaction is added to a silicon raw material immediately before pulverization thereof, the following characteristics are exhibited: First, it is possible to simultaneously pulverize these two materials (silicon and catalyst) to the same size. Second, the two materials are uniformly mixed in the suspension containing the solvent and pulverized in the above-described environment.

In addition, when the particles having a size of 20 mm or more before pulverization thereof are selected, it is possible to prevent a considerable amount of the silicon particles with an oxide present on a surface thereof from being introduced into a reaction mixture.

When the synthesis reaction of alkoxysilane is performed in the reactor, in order to stably maintain a ratio of silicon, the solvent, and the catalyst before supplying the reactor with the suspension in a measured and predetermined amount, stirring may be continuously performed.

A ceramic membrane may be mounted in a main body of the reactor, and impurities may be removed along with the suspension by continuously discharging the suspension from the reactor using the ceramic membrane.

A size of pores in the ceramic membrane may range from 1 μm to 10 μm. Pores having a size less than 1 μm make it difficult to perform a filtering process and pores having a size more than 10 μm allow the silicon particles having reactivity to pass through the membrane, thereby increasing loss of silicon. If the size of the silicon particles is 30 μm to 100 μm, a preferred pore size of the ceramic membrane is 5 μm, and the total loss of silicon is 0.5% or less.

The amount of the silicon particles, the amount of the solvent and the amount of the catalyst in the reactor may be constantly maintained throughout the overall process of synthesis of alkoxysilane.

The method for preparing monosilane may further include: (d) separating synthesized triethoxysilane as a reaction product from the reactor.

The method for preparing monosilane may further include: (f) purifying triethoxysilane separated by step (d).

A condensation process may be performed for separation of triethoxysilane synthesized through the synthesis reaction of alkoxysilane in the reactor as a reaction product, and during the condensation process, unreacted ethyl alcohol and an azeotrope of triethoxysilane and ethyl alcohol may be continuously removed from the reaction product at atmospheric pressure.

Therefore, the method for preparing monosilane may further include: (e) continuously removing unreacted anhydrous ethyl alcohol and an azeotrope of anhydrous ethyl alcohol and triethoxysilane from the reactor at atmospheric pressure during the condensation process performed for separation of triethoxysilane of step (d).

Unreacted anhydrous ethyl alcohol and the azeotrope of anhydrous ethyl alcohol and triethoxysilane, which are removed, may be continuously recycled to the reactor.

Unreacted anhydrous ethyl alcohol and the azeotrope of anhydrous ethyl alcohol and triethoxysilane, which are removed, may be supplied from a lower side of the reactor.

Triethoxysilane obtained from the reaction product of the synthesis reaction of alkoxysilane is purified by a method such as multi-stage distillation well known in the art, and then through a catalytic disproportionation reaction, monosilane may be synthesized.

In the disproportionation reaction of triethoxysilane, the disproportionation reaction of triethoxysilane may be performed at a temperature from 0° C. to 50° C. using sodium ethoxide directly prepared immediately before the disproportionation reaction of triethoxysilane as a catalyst.

Monosilane is purified by a method of adsorbing impurities in monosilane using triethoxysilane at a temperature of −140° C. or less, and, when monosilane is supplied to a cold adsorbent in a liquid phase and the purification process is performed in the direct flow mode, the established object may be achieved.

Therefore, the method for preparing monosilane may further include: (g) purifying monosilane by adsorbing impurities in monosilane at a temperature of −140° C. or less using triethoxysilane. Here, purification of monosilane may be performed at −140° C. to −150° C.

Sodium ethoxide may be directly prepared through reaction of metallic sodium with anhydrous ethyl alcohol in an inert gas immediately before the catalytic disproportionation reaction of triethoxysilane for synthesis of monosilane, and then used as a catalyst of the catalytic disproportionation reaction of triethoxysilane. In the disproportionation reaction, the catalyst directly prepared in a state of an inert gas immediately before the process serves a positive role in the synthesis rate and selectivity of monosilane during the disproportionation reaction and minimizes an influence of oxygen and moisture in an ambient environment on a surface of sodium ethoxide particles.

A reaction for preparing sodium ethoxide is performed according to the following Reaction Equation 1.

$$C_2H_5OH + Na = C_2H_5ONa + \tfrac{1}{2}H_2 \qquad \text{[Reaction Equation 1]}$$

When the anhydrous ethyl alcohol is reacted in an amount in excess of the stoichiometric amount by 2 to 5 times in Reaction Equation 1, the object may be preferably achieved.

Tetraethoxysilane may be added to a sodium ethoxide solution produced under the atmospheric condition of anhydrous ethyl alcohol by Reaction Equation 1. When tetraethoxysilane is added to the catalyst solution beforehand, an influence of moisture in air can be blocked due to hydrophobicity of tetraethoxysilane.

Anhydrous ethyl alcohol may be distilled from the produced sodium ethoxide solution. Sodium ethoxide may be dissolved in tetraethoxysilane. Sodium ethoxide may be supplied into a monosilane synthesis reactor in which monosilane is synthesized by the disproportionation reaction of triethoxysilane such that a mass ratio of sodium ethoxide dissolved in tetraethoxysilane to tetraethoxysilane ranges from 1:100 to 1:2.

For example, in order to prepare the sodium ethoxide catalyst, sodium metal having a purity of 99.9% or more is slowly dissolved in anhydrous ethyl alcohol in an amount larger than the stoichiometric amount by 2 to 5 times. Sodium is completely dissolved and then tetraethoxysilane is added to the solution, the amount is set such that the mass ratio of sodium ethoxide dissolved in tetraethoxysilane to tetraethoxysilane ranges from 1:100 to 1:2, and thereafter, ethyl alcohol is separated from the solution, and a solution of sodium ethoxide in tetraethoxysilane is directly supplied to a disproportionation reactor for synthesis of monosilane.

Triethoxysilane may be continuously supplied to the monosilane synthesis reactor at a rate ensuring that a concentration of triethoxysilane can be constantly maintained in the monosilane synthesis reactor.

Monosilane gas may be continuously discharged from an upper portion of the monosilane synthesis reactor and condensed in a collection vessel.

The monosilane gas synthesized in the monosilane synthesis reactor may be transferred to a cold adsorbent in a liquid phase.

A portion of tetraethoxysilane in which the sodium ethoxide catalyst is dissolved may be discharged from a lower portion of the monosilane synthesis reactor. That is, additional tetraethoxysilane produced as a result of the disproportionation reaction of triethoxysilane and a portion of the sodium ethoxide catalyst are continuously separated from the lower portion of the reactor, and separated by a method of distilling tetraethoxysilane from the solution. The concentration of tetraethoxysilane is regulated to a value set to return tetraethoxysilane to the reactor through distillation. 5% to 50% of the sodium ethoxide solution is replaced with a catalyst solution directly prepared immediately before the disproportionation process.

Tetraethoxysilane may be separated from the solution in which the sodium ethoxide catalyst is dissolved in tetraethoxysilane, and distillation may be performed until sodium ethoxide reaches the concentration of the solution being supplied into the monosilane synthesis reactor. The concentration of sodium ethoxide in the solution supplied into the monosilane synthesis reactor is determined such that a mass ratio of sodium ethoxide dissolved in tetraethoxysilane to tetraethoxysilane may range from 1:100 to 1:2.

A portion of the sodium ethoxide solution in tetraethoxysilane may be recycled to the monosilane synthesis reactor.

Monosilane produced from the monosilane synthesis reactor is continuously collected, and then purified within a liquid environment. When trialkoxysilane is used as an adsorbent, the content of impurities may be further decreased by purifying monosilane at a lower temperature, thereby increasing adsorbing capacity.

Collecting tetraethoxysilane obtained in each process of the present invention, removing impurities, then first using tetraethoxysilane for drying ethyl alcohol, and then using tetraethoxysilane in complete hydrolysis for preparation of high-purity silicon dioxide (silica) and ethyl alcohol may also be additionally included in the preferred method of the present invention.

In the method for preparing monosilane according to the present invention, the initial pulverization of silicon is performed in a solvent environment, not under the air atmosphere, and in this case, the oxidation layer ($SiO_2$) may be naturally prevented from being produced on the surface of metal silicon when silicon particles are pulverized and then contact oxygen in the atmosphere. The oxidation reaction may take place at any temperature including room temperature, regardless of the chemical purity of silicon. When the pulverization of silicon is performed under the air atmosphere, or when a powdered silicon raw material is generally in contact with air in another process, the oxidation reaction takes place, and thus the initial reaction induction time is essentially generated during the synthesis reaction of triethoxysilane, thereby prolonging the process time and decreasing productivity. Further, thin silicon particles have a strong moisture adsorbing capacity and thus tend to adsorb moisture from the ambient environment. When moisture is introduced into the reaction environment, the likelihood of side reaction is sharply increased and a main reaction is suppressed.

On the contrary, when a natural oxide and moisture are present on the surface of pulverized silicon particles, there are many difficulties in conducting a technical process using silicon and alcohol. One of the difficulties is that the "induction period" of reaction, meaning the time taken until a certain initial yield is reached, is encountered.

Since silicon is pulverized in a solvent environment in the method proposed in the present invention, silicon particles prepared as a result are not in contact with air and oxide is not generated, and subsequently, an activated surface which may be used in a main chemical reaction is formed, and thus it is possible to eliminate major disadvantages as set forth above. According to the technical solution in the present invention as described, an activated surface, which is not covered with oxide, is produced and a preparation to participate in the chemical reaction is completed, and the surface of the initial silicon particles is activated through a major reagent of the technical process.

Further, the size of particles specified in the method proposed in the present invention is relatively small and thus is helpful in significantly decreasing the induction period, thereby increasing contact area between major reagents. However, when silicon is pulverized in the air atmosphere, the induction period is increased and other negative characteristics of the known methods are increased. As such, a natural oxide is produced on the surface of minutely pulverized silicon, and when the particle size of silicon is decreased although its mount is maintained as the same, the total surface area is sharply increased.

If the method for preparing monosilane according to the present invention is performed in a continuous process, there are advantages in that the reaction mixture need not to be additionally replenished and that there is no need to leave the suspension alone for a long period of time in order to allow components in the suspension to precipitate.

In addition, in the method proposed in the present invention, the suspension containing a precipitate is preferably filtered using a ceramic membrane filter so as not to remove reactive silicon particles from the reactor.

Hereinafter, the present invention will be described in detail with reference to Examples.

The following Examples are designed to verify the advantages of the relevant examples by comparing various methods (Examples 2 to 4) proposed for preparation of triethoxysilane with the known analogous methods performed under the same experimental conditions explicitly described Example 1.

All experiments were conducted in the equipment specially manufactured for synthesis of alkoxysilane. The synthesis of triethoxysilane was conducted in a reactor equipped with a quad blade stirrer, which could electrically heat the reaction volume with an operating volume of 9 L and could regulate the stirring rate within the range from 300 rpm to 1500 rpm. The procedure of the synthesis process was controlled by directly taking a sample from a product produced from the reactor, analyzing the sample using an Agilent GC7890A gas chromatograph, and then using the apparatus.

Examples 5 and 6 show the selection of the optimum range of silicon particle size during the synthesis of triethoxysilane.

Examples 7 to 10 show the selection of optimum conditions for preparation of monosilane.

In Example 11, the continuous mode that enables continuous preparation during synthesis of monosilane was implemented.

Example 1

Silicon metal was pulverized in air using a planetary mill until the particle size thereof became 30 µm to 100 µm. 3.3 kg of pulverized silicon, 6.6 kg of a solvent, THERMINOL® 66, and 0.2 kg of the catalyst CuCl were put into a reactor. The contact material was heated to 242±2° C. while a stirrer is continuously operated at a rate of 850 rpm, and dried alcohol (ethanol) began to be supplied to the reactor at a maximum rate of 600 mL/h using a metering pump (digital dosing pump) GRUNDFOS® DME 60-10 AR. From the instant when a liquid product was produced from the reactor, the sample was collected every 30 minutes. When observing a sample analysis using gas chromatography Agilent® GC7890A, the synthesis reaction of triethoxysilane taking place as a result of reaction of silicon metal with ethyl alcohol began to take place 150 minutes (initial induction period) after alcohol was supplied thereto, and the intensity of the reaction was gradually increased (see the curve of Example 1 in FIG. 1). Thereafter, the reaction was terminated 500 minutes after supplying alcohol. 1435 g of triethoxysilane and 614 g of tetraethoxysilane were obtained for 500 minutes. The selectivity of triethoxysilane was 70%.

Example 2

An experiment was conducted in the same manner as in Example 1, but the preparation environment of the reaction reagent was completely different. According to the proposed method, 3.3 kg of silicon metal was continuously pulverized in 6.6 kg of solvent, THERMINOL® 66. In the pulverization process, 0.2 kg of copper (I) chloride was introduced into a liquid suspension. Alcohol was supplied to the reactor, and then the synthesis reaction began after the initial reaction induction period of 10 minutes, the reaction rate increasing thereafter for 60 minutes (see the curve of Example 2 in FIG. 1). After 180 minutes, the synthesis reaction rate of triethoxysilane began to decrease, and the reaction was completely terminated 260 minutes after supplying alcohol. 1635 g of triethoxysilane and 105 g of tetraethoxysilane were obtained. The selectivity of triethoxysilane reached 94%.

Example 3

An experiment was conducted in the same manner as in Example 2, but there is a significant difference in that a continuous process was performed by continuously supplying a liquid suspension of silicon and solvent according to the proposed method to a reactor, and the ratio of mass consumed during the reaction with ethyl alcohol was 1:2. That is, during the synthesis process of alkoxysilane, a liquid suspension of silicon was supplied thereto at a rate suitable for the consumption rate of silicon according to the reaction. The amount of silicon consumed per unit time was calculated according to the mass balance equation of the following Equation 1.

$$mSi = k1 \cdot mTES + k2 \cdot mTEOS \quad \text{[Equation 1]}$$

wherein mSi is a mass of silicon consumed as a result of direct reaction for unit time, mTES is a mass of triethoxysilane prepared as a result of direct reaction for unit time, mTEOS is a mass of tetraethoxysilane prepared as a result of direct reaction for unit time, coefficient k1 is a molecular weight ratio of silicon to triethoxysilane [molecular weight of silicon/molecular weight of triethoxysilane], and coefficient k2 is a molecular weight ratio of silicon to tetraethoxysilane [molecular weight of silicon/molecular weight of tetraethoxysilane]. Here, k1=0.171 and k2=0.135, and these were experimentally verified.

Alcohol was supplied to the reactor, and then synthesis reaction began after the initial reaction induction period of 10 minutes. The reaction rate increased for the first 90 minutes, and then stabilized when the triethoxysilane level reached 400 g/h (see the curve of Example 3 in FIG. 1). The reaction was forcefully stopped because a large amount of bubbles began to be generated on the reaction product 250 minutes after supplying alcohol. A liquid suspension of 290 g of silicon and 580 g of the solvent, THERMINOL® 66, was continuously supplied to the reactor. The solvent was additionally supplied thereto, and then the amount of the contact material in the reactor was increased, which was responsible for the generation of bubbles. For 250 minutes of the reaction process, 1600 g of triethoxysilane and 120 g of tetraethoxysilane were obtained. The selectivity of triethoxysilane was 93%.

Example 4

An experiment was conducted in the same manner as in Example 3, but there is fundamental difference in that impurities accumulated in a reaction environment were continuously purified by continuously discharging the solvent from the reaction volume through a ceramic membrane filter mounted in the main body of the reactor according to the proposed method. The solvent in which impurities were dissolved was collected in a collection vessel, regenerated, and then reused. A vacuum of 10 mbar was formed on the back of the membrane to conduct filtration through a ceramic membrane filter. The solvent was continuously discharged through the ceramic membrane from the reactor, and the amount was 2mSi as determined according to Equation 1, and corresponds to the amount of the solvent supplied to the reactor as a liquid suspension. By doing this, the components of the contact material and the level of the contact material in the reactor volume may be kept constant. The components of the contact material were regulated with the amount of the sample collected, and the level of the contact material in the reactor volume was visually regulated through a test window. After alcohol was supplied to the reactor, synthesis reaction began after the initial reaction induction period of 10 minutes, and the reaction rate rapidly increased for the first 60 minutes and slowly increased up to 120 minutes, and then the rate was stabilized at a triethoxysilane level from 420 g/h to 450 g/h (see the curve of Example 4 in FIG. 1). 3380 g of triethoxysilane and 141 g of tetraethoxysilane were obtained while a liquid suspension composed of 600 g of silicon and 1200 g of the solvent, THERMINOL® 66, was continuously supplied to the reactor for 500 minutes. The selectivity of triethoxysilane reached 96%.

The results according to Examples 1 to 4 are shown in the following Table 1.

TABLE 1

| Example | Silicon pulverization method | Reaction start time after supplying alcohol (induction period) (min) | Work | | | Result | | |
|---|---|---|---|---|---|---|---|---|
| | | | Supply | | Obtain | | | |
| | | | Silicon (g) | Solvent (g) | Solvent (g) | Amount of triethoxy-silane (g) | Amount of tetraethoxy-silane (g) | Selectivity of triethoxy-silane (%) |
| 1 | Dry type | 150 | — | — | — | 1435 | 614 | 70 |
| 2 | Wet type in the solvent environment | 10 | — | — | — | 1635 | 105 | 93 |

TABLE 1-continued

| Example | Silicon pulverization method | Reaction start time after supplying alcohol (induction period) (min) | Work Supply | | | Result | | |
|---|---|---|---|---|---|---|---|---|
| | | | Silicon (g) | Solvent (g) | Obtain Solvent (g) | Amount of triethoxy- silane (g) | Amount of tetraethoxy- silane (g) | Selectivity of triethoxy- silane (%) |
| 3 | Wet type in the solvent environment | 9 | 290 | 580 | — | 1600 | 120 | 94 |
| 4 | Wet type in the solvent environment | 10 | 600 | 1200 | 1200 | 3380 | 141 | 96 |

Example 5

An experiment was conducted in the same manner as in Example 4, but there is a fundamental difference in that silicon metal has a particle size of 100 μm or more.

Example 6

An experiment was conducted in the same manner as in Example 4, but there is a fundamental difference in that silicon metal has a particle size of 30 μm or less.

The productivity and selectivity of the technical process are indicated and shown in the following Table 2 by comparing the indices obtained in Example 4 were compared with those in Examples 5 and 6.

TABLE 2

| | Example 5 | Example 4 | Example 6 |
|---|---|---|---|
| Process parameter | Particle size of 100 μm or more | Particle size from 30 μm to 100 μm | Particle size of 30 μm or less |
| Process yield capacity | 47% | 100% | 105% |
| Selectivity of triethoxysilane | 92% | 97% | 93% |
| Loss of silicon during filtration | 1% or less | 1% or less | 30% or more |

Example 7

Preparation was performed according to Example 4, and then 875 g of triethoxysilane purified until the purity thereof became 99.999% was put into a reactor having a volume of 5 L. In the reactor, a solution of sodium ethoxide in tetraethoxysilane was put beforehand. The catalyst solution contained 68 g of commercially available sodium ethoxide manufactured by Sigma-Aldrich and 680 g of tetraethoxysilane. The temperature of the reaction material was 50° C. As a result of catalytic disproportionation of triethoxysilane, prepared monosilane gas was discharged from the upper portion of the reactor and condensed with liquid nitrogen in a collection vessel. A sample was collected from the reactor every 10 minutes, and then the components of the reaction material were analyzed by gas chromatography. The conversion ratio of triethoxysilane into monosilane after 150 minutes was 95%.

Example 8

An experiment was conducted in the same manner as in Example 7, but there was a fundamental difference in that sodium ethoxide directly prepared under an inert gas atmosphere was used as a catalyst immediately before the synthesis process. When sodium metal having a purity of 99.9% or less was used during preparation of the catalyst, sodium metal was slowly dissolved in anhydrous ethyl alcohol and collected in an amount greater than the stoichiometric amount by 5 times. Sodium was completely dissolved in the solution and then 680 g of tetraethoxysilane was added thereto, and thereafter, ethyl alcohol was separated from the solution and the solution of sodium ethoxide in tetraethoxysilane directly prepared immediately after separation was introduced into the reactor for synthesis of monosilane. The peak of triethoxysilane disappeared 30 minutes after performing chromatography, and thus it was verified that the conversion ratio of triethoxysilane into monosilane was 100%.

Example 9

An experiment was conducted in the same manner as in Example 8, but there is fundamental difference in that the synthesis process of monosilane was conducted at a temperature of 30° C. After 30 minutes, the conversion ratio of triethoxysilane into monosilane reached 99% or more.

Example 10

An experiment was conducted in the same manner as in Example 8, but there is a fundamental difference in that the synthesis process was conducted at a temperature of 0° C., which ensures liquid nitrogen on the ventilation wall of the reactor. After 30 minutes, the conversion ratio of triethoxysilane into monosilane reached 95% or more.

Results of Examples 7 to 10 are shown in the following Table 3.

TABLE 3

| Example | Catalyst | Temperature (° C.) | Reaction duration (min) | Conversion ratio of triethoxysilane |
|---|---|---|---|---|
| 7 | Sodium ethoxide from Sigma-Aldrich | 50 | 150 | 95% |
| 8 | Sodium ethoxide as prepared | 50 | 30 | 100% |
| 9 | Sodium ethoxide as prepared | 30 | 30 | >99% |
| 10 | Sodium ethoxide as prepared | 0 | 90 | >95% |

Example 11

An experiment was performed the same as in Example 8, but triethoxysilane was supplied into the reactor at a constant rate of 2,000 mL/h using a metering pump (digital dosing pump), GRUNDFOS® DME 60-10 AR. A reactor sample was tested by gas chromatography, and as a result, the content of triethoxysilane in the reaction material was maintained in a range within ±5%. Monosilane gas was continuously collected in a collection vessel, and condensed on the wall of the collection vessel cooled with liquid nitrogen. At the exit of the reactor, monosilane gas was allowed to pass through an adsorption trap, and thus ethoxysilane vapor was separated therefrom. Triethoxysilane cooled to −140° C. or less was transferred to a place at which monosilane in a liquid phase, which had been in the collection vessel, was purified using an adsorbent. The contact time with the adsorbent was 15 minutes. Thereafter, monosilane was separated from triethoxysilane through phase separation at a temperature of −80° C.

As a result of the above-described experiments through the Examples, the following results were confirmed from FIG. 1 and Tables 1 to 3.

a) When silicon is pulverized in the air atmosphere (dry type, see Example 1 and the curve of Example 1 in FIG. 1), an induction period of up to 150 minutes in Example 1 was inevitably generated. Additionally, the selectivity of triethoxysilane failed to exceed 74% and the reaction was completely terminated 260 minutes from the instant when anhydrous ethyl alcohol was supplied to the reactor, and thus there are restrictions on the duration of the reaction.

b) In the case of a proposed method (wet type, see Example 2 and the curve of Example 2 in FIG. 1) including preparing silicon in a wet manner, in other words, when silicon is pulverized in a liquid environment without contact with the atmosphere and the liquid suspension is applied immediately as solvent for the synthesis of alkoxysilane, the induction period is decreased by at least 15 times and the selectivity of triethoxysilane is ensured at the level of maximally 93%.

c) When the raw material is prepared in a wet manner, that is, silicon is pulverized according to a method (wet type, see Example 3 and the curve of Example 3 in FIG. 1) proposing two characteristics that silicon is pulverized into powder in a solvent environment and activation of the continuous process is ensured by continuously supplying a mixture of silicon and the solvent according to the amount of Equation 1 to the reactor, the induction period is decreased by 15 times or more, and process selectivity of triethoxysilane is increased to 94%. The preparation process of Example 3 was intentionally left to stand (see the curve of Example 3 in FIG. 1) because the rate at the instant when the reaction was intentionally left to stand, not when the reaction was terminated, was high enough to be at the level of maximally 400 g/h. The reason why the process was left to stand was described above, and was completely ruled out in Example 4.

d) When three characteristics of the invention explicitly described in the technical solution (claim 1) of the preparation method proposed according to the present invention are simultaneously applied, that is, when implementing a process of pulverizing silicon in a liquid environment, continuously supplying a reactor with a predetermined amount of the prepared liquid suspension which is explicitly described in the method of the present invention, and removing impurities accumulated from the reactor by continuously discharging the solvent, in an amount similar to the amount of the solvent additionally supplied to the reactor as the component of the initial liquid suspension, from the reactor while maintaining the amount of the solvent supplied and performing purification, the results as shown in Example 4, Table 1 and the curve of Example 4 in FIG. 1 are obtained.

The results are summarized as follows.

The induction period is decreased by at least 15 times or more.

The process selectivity of triethoxysilane which is a main product is ensured at the 96% level.

A synthesis process may be performed by a continuous process that maintains a high and stable reaction rate.

e) As can be seen from the results explicitly described in Table 2, a particle size from 30 μm to 100 μm is optimal for the triethoxysilane synthesis process according to the method of the present invention.

f) When the experiment is performed with the catalyst as prepared under the conditions in Example 4, the following effects are ensured as can be seen in Examples 7 to 10.

The productivity of the technical process is increased by decreasing the contact time with the reagent by 5 times or more.

The conversion ratio of triethoxysilane into monosilane reaches the maximum value.

g) Finally, when all the characteristics of the invention according to the method proposed in the present invention are simultaneously implemented as in Example 11, it is possible to conduct synthesis of monosilane as a continuous process that maintains a high and stable synthesis rate.

As described above, the technical solutions and embodiments, which are proposed in the present invention, are essential and sufficient conditions in solving major technical problems of the invention. Conditions explicitly described as preferred technology in the embodiments implement the technical solution according to the proposed method more easily and preferably, and optimize performance conditions. The preparation method proposed according to the present invention has excellent work performance, as was verified through the experiments, and when the known technical means are appropriately used, feasibility is sufficient under laboratory conditions as well as at industrial scale.

Furthermore, there is an effect that may simplify and improve the process of preparing monosilane while ensuring sustainability, operability, productivity and stability.

The invention claimed is:

1. A method for preparing monosilane, comprising:
   (a) performing wet pulverization of silicon particles in a liquid-phase solvent until the silicon particles have a particle size of 30 μm to 100 μm;
   (b) continuously supplying a suspension, which comprises the pulverized silicon particles obtained in step (a) and the solvent, into a reactor, followed by synthesizing alkoxysilane of triethoxysilane and tetraethoxysilane through reaction of the pulverized silicon particles with anhydrous ethyl alcohol using a copper-based catalyst; and
   (c) synthesizing monosilane gas from the for obtained triethoxysilane using sodium ethoxide as a catalyst.

2. The method according to claim 1, wherein the liquid-phase solvent used in step (a) is also used as a solvent for synthesis of monosilane in step (b).

3. The method according to claim 1, wherein, in step (a), synthesis of alkoxysilane of triethoxysilane and tetraethoxysilane is performed in a solvent environment, which has been heated to 160° C. to 300° C.

4. The method according to claim 1, wherein, in step (a), the wet pulverization in a liquid-phase solvent environment is performed while mixing a copper-based catalyst with the silicon particles.

5. The method according to claim 1, wherein, in step (b), the suspension, which comprises the pulverized silicon particles obtained in step (a) and the solvent, is continuously supplied into the reactor so as to be replenished in consideration of an amount of silicon consumed in synthesis reaction of alkoxysilane, and the amount of silicon consumed in the synthesis reaction is calculated from an amount of synthesized alkoxysilane according to Equation 1:

$$mSi = k1 \cdot mTES + k2 \cdot mTEOS \qquad (1),$$

where mSi is a mass of silicon consumed as a result of direct reaction for unit time, mTES is a mass of triethoxysilane prepared as a result of direct reaction for unit time, mTEOS is a mass of tetraethoxysilane prepared as a result of direct reaction for unit time, coefficient k1 is a molecular weight ratio of silicon to triethoxysilane [molecular weight of silicon/molecular weight of triethoxysilane], and coefficient k2 is a molecular weight ratio of silicon to tetraethoxysilane [molecular weight of silicon/molecular weight of tetraethoxysilane].

6. The method according to claim 1, wherein in step (b), a weight ratio of the solvent to silicon in the suspension continuously supplied into the reactor ranges from 1:2 to 2:1.

7. The method according to claim 1, wherein the suspension is continuously discharged from the reactor in the same amount as the suspension supplied into the reactor.

8. The method according to claim 7, wherein impurities are removed by continuously discharging the suspension from the reactor using a ceramic membrane mounted in a main body of the reactor.

9. The method according to claim 8, wherein the ceramic membrane has a pore size in the range of 1 µm to 10 µm.

10. The method according to claim 1, further comprising:
(d) separating the synthesized triethoxysilane as a reaction product from the reactor;
(e) continuously removing unreacted anhydrous ethyl alcohol and an azeotropic mixture of anhydrous ethyl alcohol and triethoxysilane from the reactor at atmospheric pressure during a condensation process performed for separation of triethoxysilane of step (d);
(f) purifying triethoxysilane separated by step (d); and
(g) purifying monosilane by adsorbing impurities in monosilane at a temperature from −150° C. to −140° C. using triethoxysilane.

11. The method according to claim 10, wherein, in step (e), the unreacted anhydrous ethyl alcohol and the azeotropic mixture of anhydrous ethyl alcohol and triethoxysilane removed from the reaction product of step (d), are continuously recycled to the reactor, wherein the unreacted anhydrous ethyl alcohol or the azeotropic mixture of anhydrous ethyl alcohol and triethoxysilane is supplied from a lower side of the reactor.

12. The method according to claim 1, wherein sodium ethoxide prepared immediately before a disproportionation process at a temperature of 0° C. to 50° C. is used as the catalyst.

13. The method according to claim 1, wherein sodium ethoxide directly prepared through reaction of sodium metal and anhydrous ethyl alcohol under an inert gas atmosphere immediately before synthesis of the monosilane gas in step (c) is used as the catalyst of step (c), wherein in the reaction of sodium metal and anhydrous ethyl alcohol, the anhydrous ethyl alcohol is reacted 2 times to 5 times more in an amount than the stoichiometric amount.

14. The method according to claim 13, wherein, when the sodium ethoxide is directly prepared through reaction of the sodium metal and the anhydrous ethyl alcohol, tetraethoxysilane is added to a solution of the sodium ethoxide produced in the anhydrous ethyl alcohol environment,
wherein the anhydrous ethyl alcohol is distilled from the produced sodium ethoxide solution.

15. The method according to claim 1, wherein, in step (c), the sodium ethoxide is dissolved in tetraethoxysilane and supplied into the monosilane synthesis reactor for synthesizing monosilane such that a mass ratio of sodium ethoxide dissolved in tetraethoxysilane to tetraethoxysilane ranges from 1:100 to 1:2.

16. The method according to claim 1, wherein, in step (c), triethoxysilane is continuously supplied into the monosilane synthesis reactor for synthesizing monosilane gas at a rate at which a concentration of triethoxysilane in reactants in the monosilane synthesis reactor can be constantly maintained.

17. The method according to claim 1, wherein, in step (c), the monosilane gas is transferred to an adsorbent in a liquid phase.

18. The method according to claim 1, wherein, in step (c), a portion of tetraethoxysilane, in which the catalyst of sodium ethoxide is dissolved, is discharged from a lower side of the monosilane synthesis reactor.

19. The method according to claim 18, wherein tetraethoxysilane is separated from the solution, in which the catalyst of sodium ethoxide is dissolved in tetraethoxysilane provided that distillation is performed until a mass ratio of sodium ethoxide dissolved in tetraethoxysilane to tetraethoxysilane reaches a concentration of 1:100 to 1:2, wherein a portion of the sodium ethoxide solution in tetraethoxysilane is recycled and supplied into the monosilane synthesis reactor.

20. The method according to claim 1, wherein tetraethoxysilane obtained in each operation is collected, impurities are removed, then tetraethoxysilane is first used for drying ethyl alcohol, and then tetraethoxysilane is used in a complete hydrolysis for preparation of high-purity silicon dioxide (silica) and ethyl alcohol.

* * * * *